(12) United States Patent
Matsuura et al.

(10) Patent No.: US 11,818,300 B2
(45) Date of Patent: *Nov. 14, 2023

(54) PROCESSING SYSTEM, PROCESSING METHOD, AND NON-TRANSITORY STORAGE MEDIUM

(71) Applicant: NEC Corporation, Tokyo (JP)

(72) Inventors: Hiroki Matsuura, Tokyo (JP); Shuji Komeiji, Tokyo (JP); Takayuki Shirokaze, Tokyo (JP); Ryoji Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,543

(22) Filed: Oct. 3, 2022

(65) Prior Publication Data

US 2023/0027992 A1     Jan. 26, 2023

Related U.S. Application Data

(63) Continuation of application No. 17/312,170, filed as application No. PCT/JP2019/036062 on Sep. 13, 2019, now Pat. No. 11,503,161.

(30) Foreign Application Priority Data

Dec. 11, 2018    (JP) ................................. 2018-231461

(51) Int. Cl.
    *H04M 3/56*       (2006.01)
    *G10L 15/06*     (2013.01)
    (Continued)

(52) U.S. Cl.
    CPC ............. *H04M 3/56* (2013.01); *G10L 15/063* (2013.01); *H04M 3/4285* (2013.01); *H04M 3/493* (2013.01)

(58) Field of Classification Search
    CPC ...... H04M 3/56; H04M 3/4285; H04M 3/493; G10L 15/063

See application file for complete search history.

(56) References Cited

U.S. PATENT DOCUMENTS

| 6,188,429 B1 | 2/2001 | Martin ................ H04L 12/1827 348/14.02 |
| 6,424,989 B1 * | 7/2002 | Shaw ..................... H04N 19/42 375/E7.176 |

(Continued)

FOREIGN PATENT DOCUMENTS

| AU | 2006343379 A1 | 11/2008 | ........... G06F 17/289 |
| CA | 2622317 A1 | 3/2007 | .............. H04M 3/56 |

(Continued)

OTHER PUBLICATIONS

Extended European Search Report for EP Application No. 19895333.3 dated Jan. 7, 2022.

(Continued)

*Primary Examiner* — Akelaw Teshale

(57) ABSTRACT

The example embodiments provides a processing system (10) including: an acquisition unit (11) that acquires target speech data in which a target speech is recorded or a target feature value that indicates a feature of the target speech; an inference unit (12) that infers a language of the target speech, based on an inference model for inferring a language of a speech from speech data or a speech feature value and the target speech data or the target feature value; a result output unit (13) that outputs an inference result by the inference unit (12); a determination unit (14) that determines whether the inference result is correct; and a learning data output unit (15) that outputs the inference result determined to be correct by the determination unit (14) and the target (Continued)

speech data or the target feature value, as learning data for generating the inference model.

7 Claims, 17 Drawing Sheets

(51) Int. Cl.
*H04M 3/428* (2006.01)
*H04M 3/493* (2006.01)

(56) References Cited

U.S. PATENT DOCUMENTS

| | | | | |
|---|---|---|---|---|
| 9,025,760 | B1 | 5/2015 | Pettay | H04M 3/562 |
| | | | | 379/202.01 |
| 9,253,329 | B1* | 2/2016 | Pettay | H04M 3/56 |
| 9,614,969 | B2 | 4/2017 | Aue | H04M 3/568 |
| 2007/0064915 | A1* | 3/2007 | Moore, Jr. | H04M 3/56 |
| | | | | 379/265.12 |
| 2007/0064916 | A1* | 3/2007 | Moore, Jr. | H04M 3/42 |
| | | | | 379/265.12 |
| 2007/0121903 | A1* | 5/2007 | Moore, Jr. | G06Q 20/085 |
| | | | | 379/265.12 |
| 2007/0206761 | A1* | 9/2007 | Anders | H04M 3/2281 |
| | | | | 379/207.01 |
| 2011/0224970 | A1* | 9/2011 | Bernal | H04M 3/51 |
| | | | | 704/8 |
| 2012/0010886 | A1* | 1/2012 | Razavilar | G10L 15/005 |
| | | | | 704/E17.001 |
| 2015/0256955 | A1* | 9/2015 | Hwang | H04M 1/6008 |
| | | | | 381/56 |
| 2015/0347399 | A1* | 12/2015 | Aue | H04M 3/42 |
| | | | | 704/2 |
| 2015/0350451 | A1* | 12/2015 | Aue | G06F 40/58 |
| | | | | 379/202.01 |
| 2016/0170970 | A1* | 6/2016 | Lindblom | G10L 21/003 |
| | | | | 704/3 |
| 2019/0102713 | A1* | 4/2019 | Ezell | G06Q 10/06 |

FOREIGN PATENT DOCUMENTS

| | | | | |
|---|---|---|---|---|
| JP | 2003032373 | A | | 1/2003 |
| JP | 2010021692 | A * | | 1/2010 |
| JP | 2010021692 | A | | 1/2010 |
| JP | 2012103564 | A | | 5/2012 |
| JP | 2017143322 | A * | | 8/2017 |
| JP | 2018128575 | A | | 8/2018 |
| JP | 2018128576 | A | | 8/2018 |
| JP | 2018174416 | A | | 11/2018 |
| WO | WO-0137528 | A1 * | 5/2001 | H04M 15/00 |
| WO | WO-2004030329 | A1 | 4/2004 | H04M 3/51 |
| WO | WO-2008036535 | A2 | 3/2008 | H04M 3/51 |

OTHER PUBLICATIONS

International Search Report of PCT Application No. PCT/JP2019/036062 dated Dec. 3, 2019.

* cited by examiner

FIG. 6

| INTERPRETER | LANGUAGE | CONTACT INFORMATION |
|---|---|---|
| TARO NIPPON | CHINESE | * * * * * |
| ⋮ | ⋮ | ⋮ |

PROCESSING SYSTEM, PROCESSING METHOD, AND NON-TRANSITORY STORAGE MEDIUM

CROSS-REFERENCE TO RELATED APPLICATIONS

The present application is a continuation application of U.S. patent application Ser. No. 17/312,170 filed on Jun. 9, 2021, which is a National Stage Entry of international application PCT/JP2019/036062 filed on Sep. 13, 2019, which claims the benefit of priority from Japanese Patent Application No. 2018-231461 filed on Dec. 11, 2018, the disclosures of all of which are incorporated in their entirety by reference herein.

TECHNICAL FIELD

The example embodiments relates to a processing system, a processing method, and a program.

BACKGROUND ART

PTL 1 discloses an apparatus that infers a language of a speech from speech data by use of an inference model generated through machine learning.

PTL 2 discloses a multi-lingual operation system that achieves a three-party call among a foreigner who is a calling party, a responder who responds to a phone call from the foreigner, and a support team that supports communication between the foreigner and the responder. Specifically, the multi-lingual operation system, after receiving a specification of a language from a foreigner or a responder, connects a support team related to the specified language to the multi-lingual operation system and starts a three-party call. In other words, a language that a foreigner speaks is identified based on contents specified by a person concerned.

RELATED DOCUMENT

Patent Document

[PTL 1] Japanese Patent Application Publication No. 2012-103554
[PTL 2] Japanese Patent Application Publication No. 2003-32373

DISCLOSURE OF THE INVENTION

Problem to be Solved

While, in order to improve precision in inferring a language, it is necessary to increase an amount of learning data on which machine learning is performed, neither PTL 1 nor PTL 2 discloses the problem and a means for solving the problem. A problem to be solved by the example embodiments is to improve inference precision in a technique for inferring a language by use of an inference model generated through machine learning.

Solution to Problem

According to the example embodiments, a processing system including:
an acquisition unit that acquires target speech data in which a target speech being a speech subject to language inference is recorded or a target feature value that indicates a feature of the target speech;
an inference unit that infers a language of the target speech, based on an inference model for inferring a language of a speech from speech data in which the speech is recorded or a speech feature value that indicates a feature of the speech and the target speech data or the target feature value;
a result output unit that outputs an inference result by the inference unit;
a determination unit that determines whether the inference result is correct; and
a learning data output unit that outputs the inference result being determined to be correct by the determination unit and the target speech data or the target feature value, as learning data for generating the inference model is provided.

Further, according to the example embodiments, provided is a processing method executed by a computer, the method including:
an acquisition step of acquiring target speech data in which a target speech being a speech subject to language inference is recorded or a target feature value that indicates a feature of the target speech;
an inference step of inferring a language of the target speech, based on an inference model for inferring a language of a speech from speech data in which the speech is recorded or a speech feature value that indicates a feature of the speech and the target speech data or the target feature value;
a result output step of outputting an inference result in the inference step;
a determination step of determining whether the inference result is correct; and
a learning data output step of outputting the inference result being determined to be correct in the determination step and the target speech data or the target feature value, as learning data for generating the inference model.

Further, according to the example embodiments, a program causing a computer to function as:
an acquisition unit that acquires target speech data in which a target speech being a speech subject to language inference is recorded or a target feature value that indicates a feature of the target speech;
an inference unit that infers a language of the target speech, based on an inference model for inferring a language of a speech from speech data in which the speech is recorded or a speech feature value that indicates a feature of the speech and the target speech data or the target feature value;
a result output unit that outputs an inference result by the inference unit;
a determination unit that determines whether the inference result is correct; and
a learning data output unit that outputs the inference result being determined to be correct by the determination unit and the target speech data or the target feature value as learning data for generating the inference model is provided.

Advantageous Effects of Invention

The example embodiments enables inference precision to be improved in a technique for inferring a language by use of an inference model generated through machine learning.

BRIEF DESCRIPTION OF THE DRAWINGS

The above-described object and other objects, features, and advantages will be more apparent by the preferred example embodiments described below and the following drawings accompanying therewith.

FIG. 6 is a diagram schematically illustrating one example of information that the processing system according to the example embodiment processes.

DESCRIPTION OF EMBODIMENTS

First Example Embodiment

First, an outline of a processing system of a example embodiment will be described. The processing system infers a language of a speech subject to language inference, based on an inference model generated through machine learning and speech data in which the speech subject to language inference is recorded or a feature value of the speech. Succeedingly, the processing system outputs an inference result and also determines whether the inference result is correct. The processing system outputs the inference result determined to be correct and the speech data in which the speech subject to language inference is recorded or the feature value of the speech, as learning data for generating an inference model.

Next, a configuration of a processing system 10 will be described in detail. First, one example of a hardware configuration of the processing system 10 will be described. Each functional unit that the processing system 10 includes is achieved by any combination of hardware and software mainly including a central processing unit (CPU) of any computer, a memory, a program loaded in the memory, a storage unit (capable of storing not only a program that has been stored in advance since a stage at which an apparatus is shipped but also a program downloaded from a storage medium, such as a compact disc (CD), or a server on the Internet), such as a hard disk, that stores the program, and an interface for network connection. A person skilled in the art can understand that methods and apparatuses for achieving each functional unit have a variety of variations.

Figure 1:
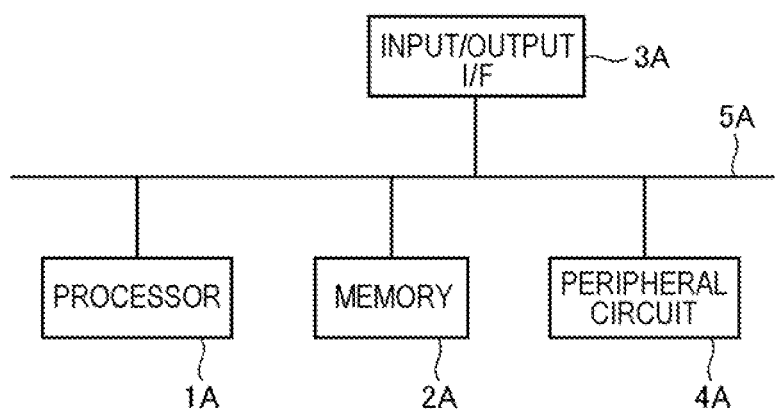
FIG. 1 is a diagram illustrating one example of a hardware configuration of a processing system according to the example embodiment.

FIG. 1 is a block diagram illustrating a hardware configuration of the processing system 10. As illustrated in FIG. 1, the processing system 10 includes a processor 1A, a memory 2A, an input/output interface 3A, a peripheral circuit 4A, and a bus 5A. The peripheral circuit 4A includes a variety of modules. The processing system 10 does not have to include the peripheral circuit 4A. Note that, the processing system 10 may be constituted by a plurality of apparatuses that are physically and/or logically separated from one another. In this case, each of the plurality of apparatuses can include the above-described hardware configuration.

The bus 5A is a data transmission path through which the processor 1A, the memory 2A, the peripheral circuit 4A, and the input/output interface 3A transmit and receive data to and from one another. The processor 1A is an arithmetic processing apparatus, such as a CPU and a graphics processing unit (GPU). The memory 2A is a memory, such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, or the like. The output apparatus is, for example, a display, a speaker, a printer, a mailer, or the like. The processor 1A is capable of outputting a command to each module and performing an arithmetic operation, based on an arithmetic operation result of the module.

Figure 2:
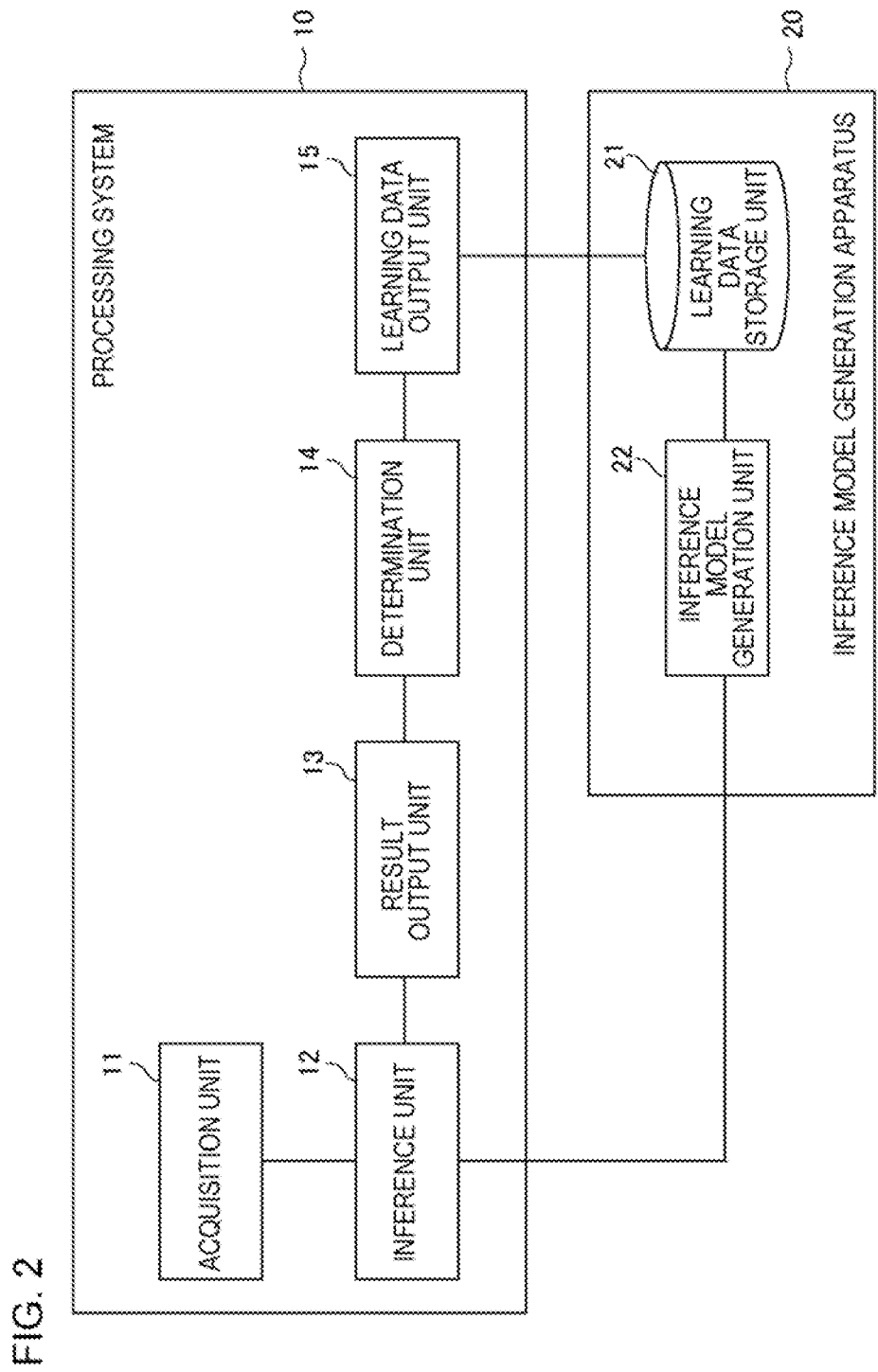
FIG. 2 is one example of a functional block diagram of the processing system according to the example embodiment.

Next, an example of a functional configuration of the processing system 10 will be described. As illustrated in a functional block diagram in FIG. 2, the processing system 10 includes an acquisition unit 11, an inference unit 12, a result output unit 13, a determination unit 14, and a learning data output unit 15.

Note that, although, in the drawing, the processing system 10 and an inference model generation apparatus 20 are illustrated as separate elements, the processing system 10 may include the inference model generation apparatus 20. In other words, the processing system 10 and the inference model generation apparatus 20 may physically and/or logically be separated from each other or the processing system 10 and the inference model generation apparatus 20 may physically and logically be integrated.

A learning data storage unit 21 stores learning data in which speech data in which a speech is recorded or a speech feature value that indicates a feature of the speech, and a language (example: Japanese, English, Chinese, and the like) of the speech are paired with each other. A speech feature value is extracted from speech data.

An inference model generation unit 22 generates an inference model for inferring a language of a speech from speech data or a speech feature value through machine learning using learning data stored in the learning data storage unit 21. A technique for the machine learning is not specifically limited, and any technique may be employed.

The acquisition unit 11 acquires target speech data in which a target speech being a speech subject to language inference is recorded or a target feature value that indicates a feature of the target speech. A target feature value is extracted from target speech data.

Note that, in the description of the example embodiments, "acquisition" includes at least one of "fetching, by an own apparatus, data stored in another apparatus or a storage medium (active acquisition)", based on a user input or an instruction from a program, for example, requesting or inquiring another apparatus and receiving data, accessing another apparatus or a storage medium and reading data, or the like, "inputting data output from another apparatus into the own apparatus (passive acquisition)", based on a user input or an instruction from a program, for example, receiving data being distributed (or transmitted, sent by push notification, or the like) or selecting and acquiring data from among received data or information, and "generating new data by editing or the like data (transforming data to text, rearranging data, extracting a portion of data, changing a file format, or the like) and acquiring the new data"

The inference unit 12 infers a language of a target speech, based on an inference model that the inference model generation unit 22 generates and target speech data or a target feature value that the acquisition unit 11 acquires.

The result output unit 13 outputs an inference result by the inference unit 12. The result output unit 13 is able to output an inference result via an output apparatus such as a display, a speaker, a printer, a projection apparatus, and a mailer.

The determination unit 14 determines whether an inference result by the inference unit 12 is correct. The determination unit 14 is able to acquire a predetermined determination material and determine whether an inference result is correct, based on the determination material. The determination material may be information ("correct" or "wrong") that is an input by a user and directly indicates whether an inference result is correct, or information that is acquired by a means other than a user input and indirectly indicates whether an inference result is correct. Note that, an example in which the determination unit 14 determines whether an inference result is correct, based on information that is acquired by a means other than a user input and indirectly indicates whether the inference result is correct will be described in the following example embodiment.

The learning data output unit 15 outputs an inference result determined to be correct by the determination unit 14 and target speech data or a target feature value from which the inference result is derived by the inference unit 12, as learning data for generating an inference model. The learning data being output by the learning data output unit 15 are stored in the learning data storage unit 21.

Figure 3:
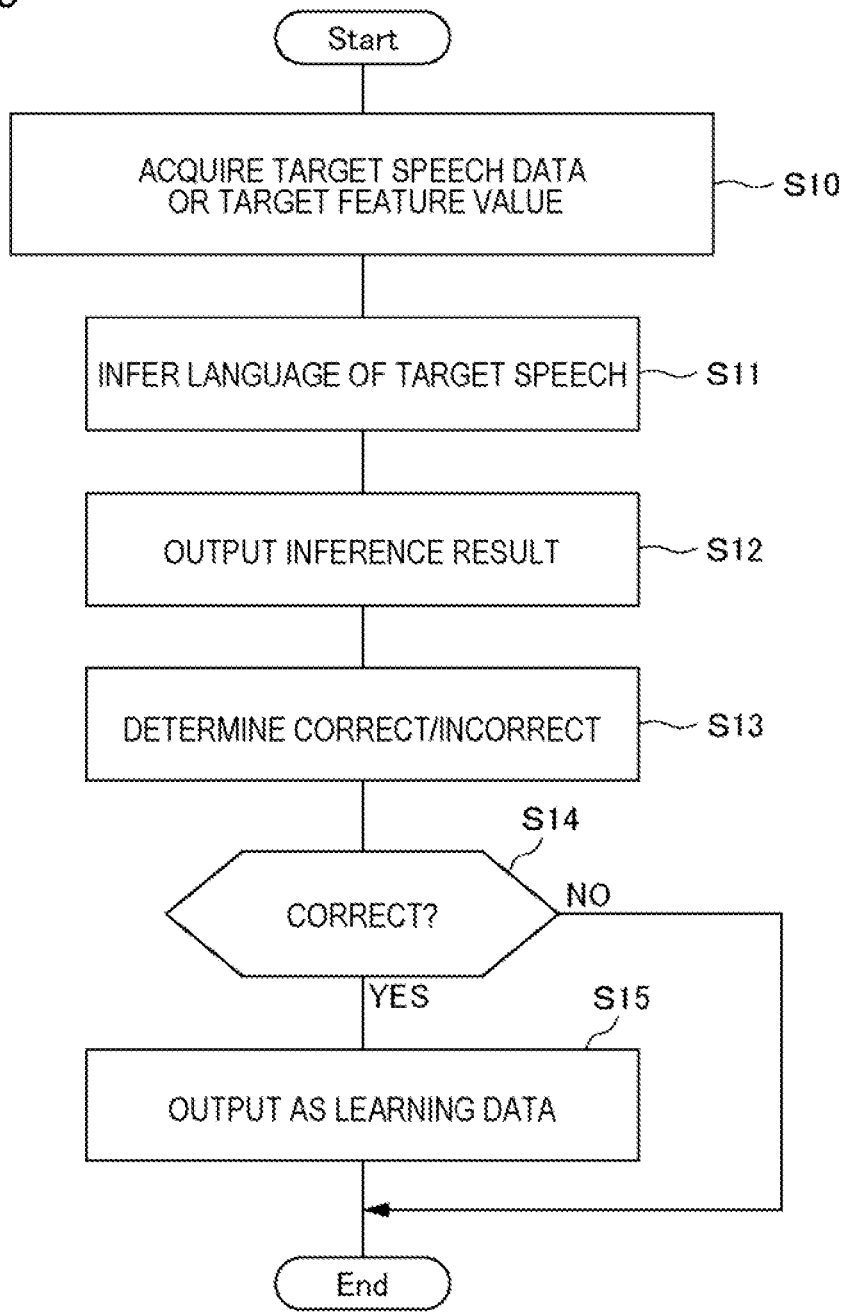
FIG. 3 is a flowchart illustrating one example of a flow of processing in the processing system according to the example embodiment.

Next, by use of a flowchart in FIG. 3, one example of a flow of processing in the processing system 10 will be described.

First, when the acquisition unit 11 acquires new target speech data or a new target feature value (S10), the inference unit 12 infers a language of the target speech, based on an inference model generated by the inference model generation unit 22 and the target speech data or the target feature value acquired in S10 (S11). Next, the result output unit 13 outputs an inference result inferred in S11 (S12).

Subsequently, the determination unit 14 determines whether the inference result inferred in S12 is correct (S13). For example, the determination unit 14 may acquire information that is an input by a user and directly indicates whether the inference result is correct, and determine whether the inference result is correct, based on the information.

When a determination result by the determination unit 14 is not "correct" (No in S14), the process is terminated.

On the other hand, when the determination result by the determination unit 14 is "correct" (Yes in S14), the learning data output unit 15 outputs the target speech data or the target feature value acquired in S10 and the inference result inferred in S11, as learning data (S15).

The learning data being output by the learning data output unit 15 in S15 are stored in the learning data storage unit 21. Subsequently, although not illustrated, the inference model generation unit 22 generates an inference model for inferring a language of a speech from speech data or a speech feature value through machine learning using learning data stored in the learning data storage unit 21.

The inference model generation unit 22 may newly perform machine learning and generate a new inference model every time a piece of new learning data is registered in the learning data storage unit 21. Alternatively, the inference model generation unit 22 may newly perform machine learning and generate a new inference model every time a predetermined number (any number of two or more) of pieces of new learning data are registered in the learning data storage unit 21. Still alternatively, the inference model generation unit 22 may newly perform machine learning and generate a new inference model every time a preset time is reached. Still alternatively, the inference model generation unit 22 may newly perform machine learning and generate a new inference model at a timing at which a user input for updating an inference model is received. Note that, the above-exemplified timings at which machine learning is performed are only examples and the timing is not limited thereto.

Consequently, the processing system 10 that performs language inference in conjunction with generation of learning data using an inference result enables the learning data to be increased while performing a process of inferring a language. As a result, it is possible to avoid troublesome work only for increasing the learning data.

In addition, with the processing system 10 having the above-described characteristics, it is possible to increase learning data, based on an inference result acquired in practical business, while using the processing system 10 in the practical business and causing the processing system 10 to infer a language. With the processing system 10 as described above, it is possible to efficiently increase learning data suitable for practical business, specifically, learning data of a language having an opportunity to deal with in the practical business. As a consequence, an inference model suitable for practical business is caused to be generated. As described above, it is possible to provide the processing system 10 with performance specialized in needs in an environment in which the processing system 10 is used.

Second Example Embodiment

A processing system 10 of a example embodiment differs from the processing system of the first example embodiment in a point including a call means, setting a speech of a calling party as a target speech, and the like.

One example of a hardware configuration of the processing system 10 is similar to the first example embodiment.

Figure 4:
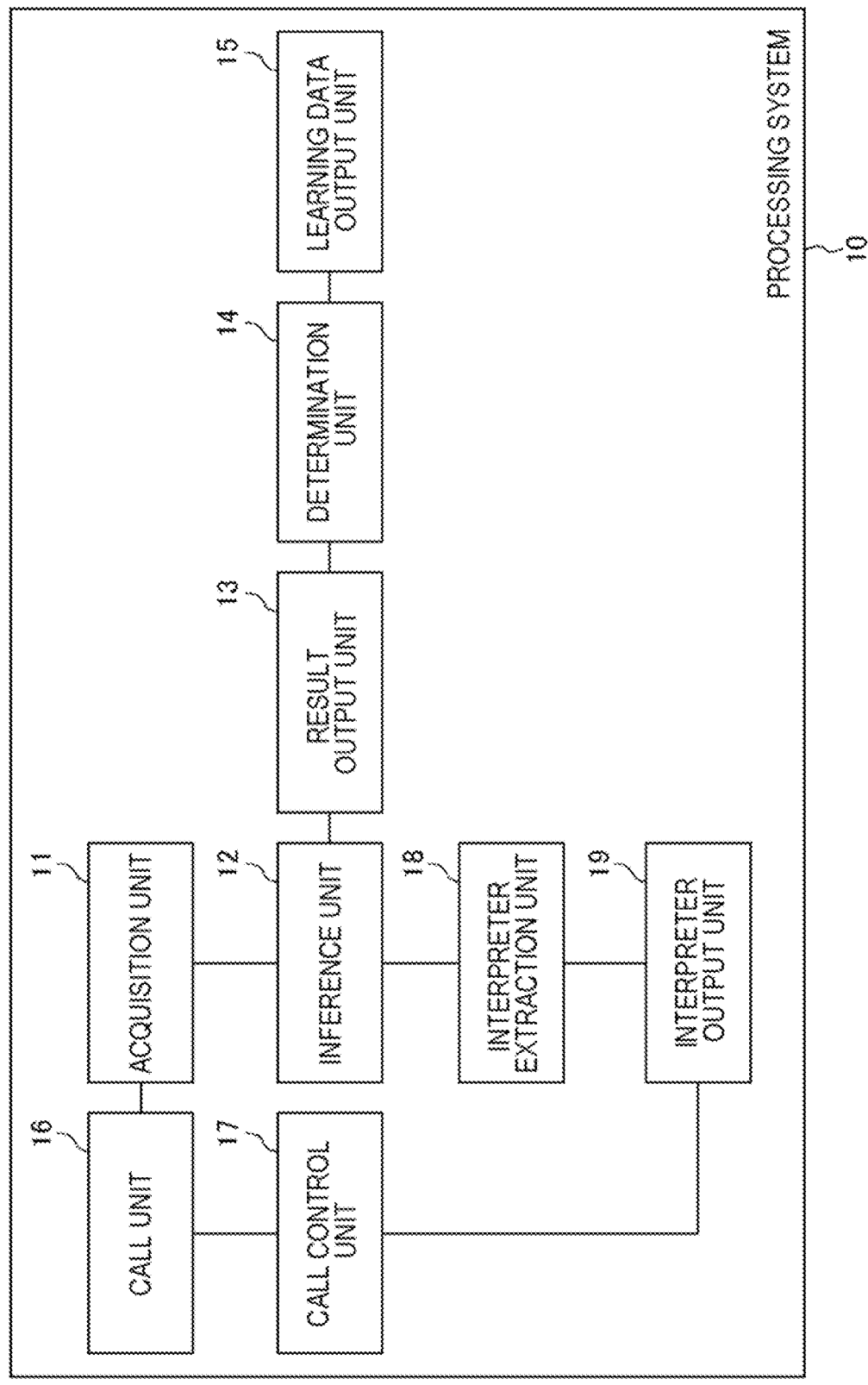
FIG. 4 is one example of a functional block diagram of the processing system according to the example embodiment.

One example of a functional block diagram of the processing system 10 is illustrated in FIG. 4. As illustrated, the processing system 10 includes an acquisition unit 11, an inference unit 12, a result output unit 13, a determination unit 14, a learning data output unit 15, a call unit 16, a call control unit 17, an interpreter extraction unit 18, and an interpreter output unit 19. Note that, although not illustrated, the processing system 10 may include a learning data storage unit 21 and an inference model generation unit 22.

Figure 5:
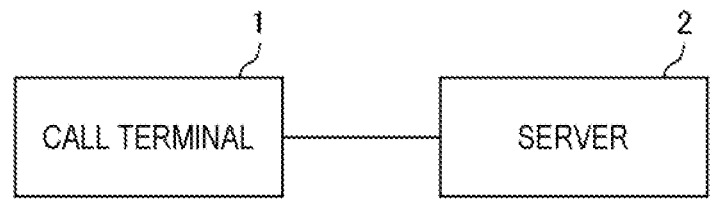
FIG. 5 is one example of a functional block diagram of the processing system according to the example embodiment.

The processing system 10 is constituted of a call terminal 1 or both the call terminal 1 and a server 2 illustrated in FIG. 5. In other words, the call terminal 1 may include all the functional units that the processing system 10 includes. Alternatively, the call terminal 1 may include some of the functional units that the processing system 10 includes and the server 2 may include the other functional units. The call terminal 1 may be an apparatus in which a predetermined functional unit is set up by installing a predetermined application into a terminal apparatus such as a personal computer, a tablet terminal, and a smartphone, or may be a terminal that is dedicated to a call and in which a predetermined functional unit is set up in advance.

The call unit 16 has a function of connecting to another call terminal and achieving a call.

The acquisition unit 11 acquires target speech data in which a speech of a calling party is recorded or a target feature value that indicates a feature of the speech of the calling party. The other configuration of the acquisition unit 11 is similar to that of the first example embodiment.

The configurations of the inference unit 12, the result output unit 13, the determination unit 14, and the learning data output unit 15 are similar to those of the first example embodiment.

The interpreter extraction unit 18 refers to interpretation staff information in which an interpreter for each of a plurality of languages and contact information of the interpreter are registered, and extracts an interpreter for a language indicated by an inference result. In FIG. 6, one example of the interpretation staff information is schematically illustrated.

The interpreter output unit 19 outputs information indicating an interpreter being extracted by the interpreter extraction unit 18. The interpreter output unit 19 is able to output information indicating an interpreter being extracted by the interpreter extraction unit 18 via an output apparatus such as a display, a speaker, a printer, a projection apparatus, and a mailer. The interpreter output unit 19 may, for example, output a list of extracted interpreters.

The call control unit 17 puts a call with a calling party on hold, based on a user input. The call control unit 17 specifies one interpreter from among interpreters extracted by the interpreter extraction unit 18, and causes a call (example: an internal call) with the specified interpreter to be started. For example, the call control unit 17 may specify one interpreter, based on a user input, or may specify one interpreter in accordance with a predetermined rule. Although examples of the predetermined rule include, for example, a rule of "an interpreter who has had a smallest number of three-party calls up to the present time on the day", or the like, the predetermined rule is not limited thereto.

When the call control unit 17 receives a predetermined input after putting a call with the calling party on hold and causing a call with the specified interpreter to be started, the call control unit 17 is able to cause a three-party call including the calling party and the interpreter to be started.

Next, using a sequence diagram in FIG. 7, one example of a flow of processing in the processing system 10 will be described.

A first call terminal is a call terminal that a calling party uses. In this example, it is assumed that a calling party is a foreigner. Note that, a foreigner is supposed to be a person who speaks a language other than an official language in a region where the processing system according to the example embodiment is used or a person who speaks a language other than a language that persons concerned specify.

A second call terminal is a call terminal that a responding operator whose task is to perform customer response using a phone uses. The second call terminal may include all the functional units that the processing system 10 includes, or may include some of the functional units that the processing system 10 includes.

A third call terminal is a call terminal that an interpretation staff member related to a predetermined language uses.

Figure 8:
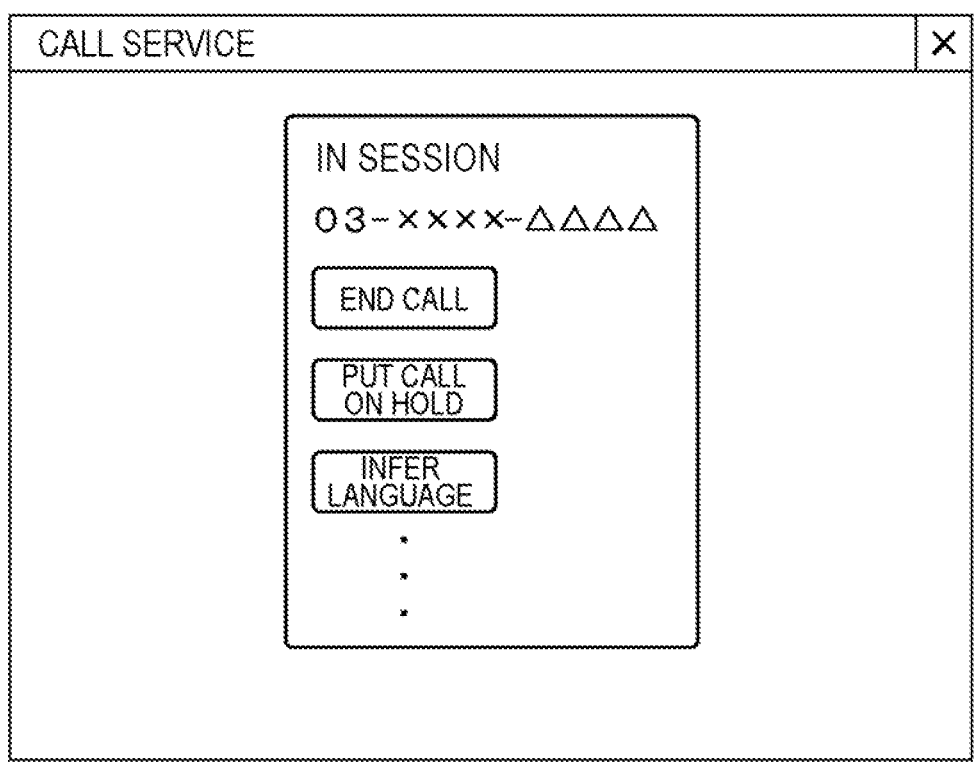
FIG. 8 is a diagram schematically illustrating one example of a screen that the processing system according to the example embodiment outputs.

First, when a call request is sent from the first call terminal to the second call terminal (S20) and a call acceptance to the call request is sent from the second call terminal to the first call terminal (S21), a call is started between the first call terminal and the second call terminal (S22) and a state that allows a call to be performed (hereinafter, "call state") is established. One example of a screen displayed on the second call terminal in the call state is illustrated in FIG. 8. In the drawing, a window including information indicating that a call is in session, the phone number of a calling party, and user interface (UI) buttons for performing various types of operations is illustrated. The UI buttons include a call end button for ending a call, a hold button for putting a call into a hold state, a language inference button for performing a process for inferring a language of a calling party, and the like.

When the responding operator, although recognizing that the calling party is a foreigner, cannot recognize a language of the calling party during a call, the responding operator puts the call into a hold state by pressing the hold button (S23 and S24) and, subsequently, presses the language inference button. In response to the press of the language inference button, language inference processing is performed (S25).

In S25, the acquisition unit 11 acquires target speech data in which a speech of the calling party is recorded or a target feature value that indicates a feature of the speech of the calling party. For example, the second call terminal may be configured to record all calls regardless of a calling party. The acquisition unit 11 may acquire a portion or all of speech data being recorded as described above, as target speech data. The acquisition unit 11 may also extract a target feature value from the target speech data acquired in this manner. Succeedingly, the inference unit 12 infers a language of the target speech, based on an inference model generated by the inference model generation unit 22 and the target speech data or the target feature value acquired by the acquisition unit 11.

Figure 9:
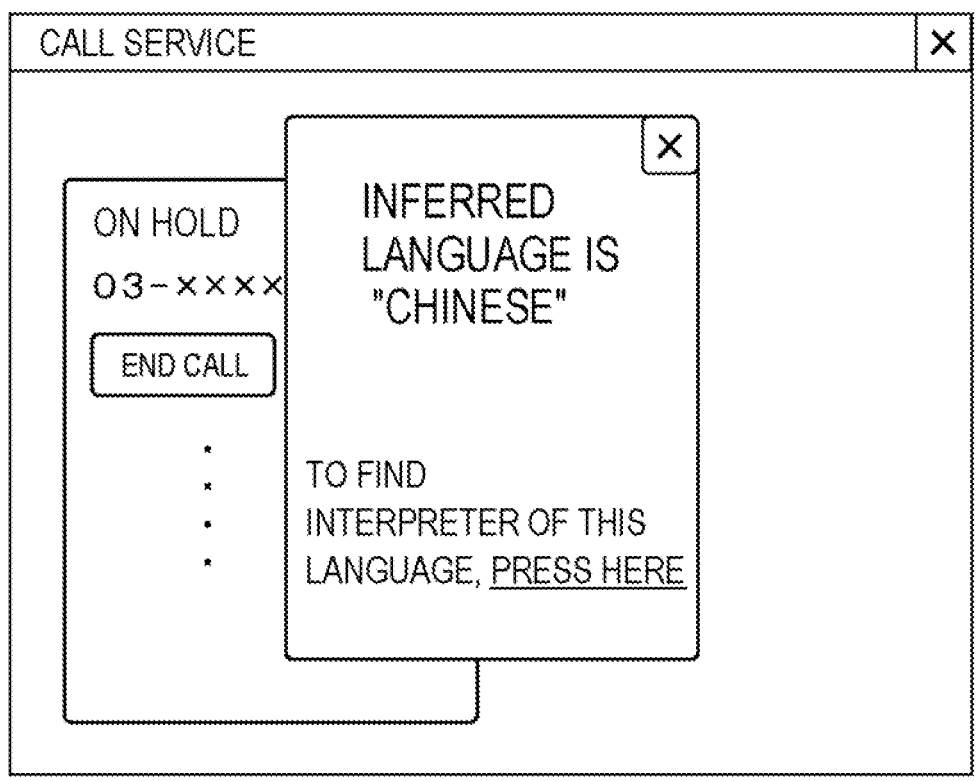
FIG. 9 is a diagram schematically illustrating one example of a screen that the processing system according to the example embodiment outputs.

The result output unit 13 outputs an inference result inferred (S26). In FIG. 9, one example of a screen being displayed on the second call terminal when the result output unit 13 outputs an inference result is illustrated. In the drawing, a window indicating an inference result is displayed. In the window, a link to information indicating an interpreter of a language indicated by the inference result is set.

Figure 10:
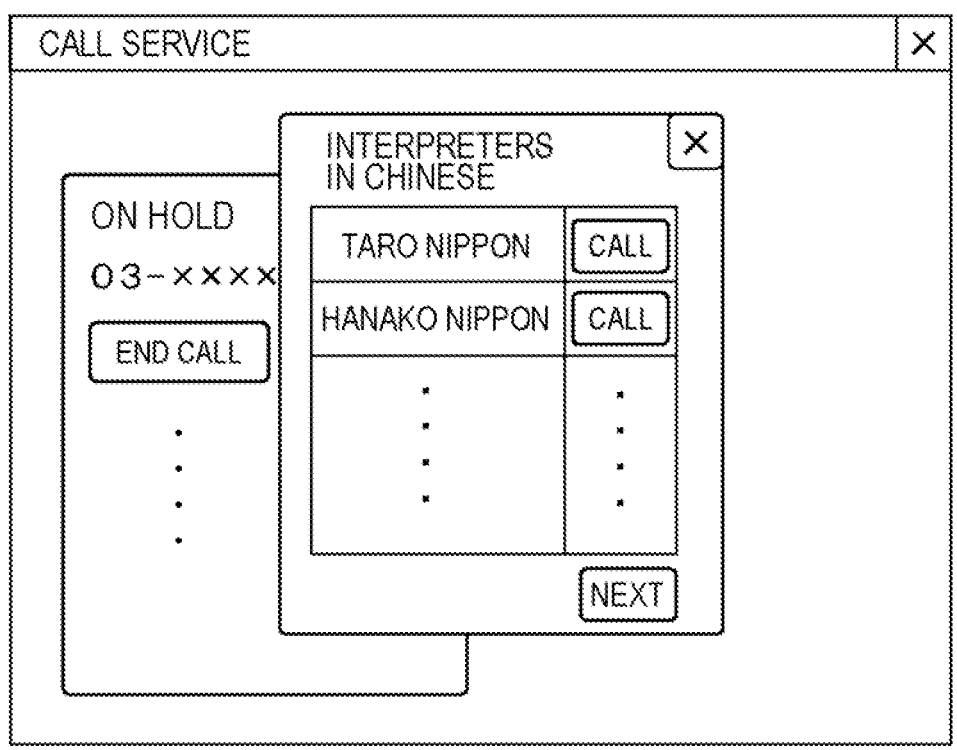
FIG. 10 is a diagram schematically illustrating one example of a screen that the processing system according to the example embodiment outputs.

For example, in the screen illustrated in FIG. 9, when the link to information indicating an interpreter is pressed, the interpreter output unit 19 acquires and outputs information indicating an interpreter being extracted by the interpreter extraction unit 18 (S27). The interpreter extraction unit 18 refers to interpretation staff information (see FIG. 6) in which an interpreter for each of a plurality of languages and contact information of the interpreter are registered, and extracts an interpreter for the language indicated by the inference result. In FIG. 10, one example of a screen being displayed on the second call terminal when the interpreter output unit 19 outputs information indicating an interpreter is illustrated. In the drawing, a window indicating interpreters for the language indicated by the inference result is displayed. In the window, a list of names of interpreters is displayed, and call buttons to start a call with each interpreter are also displayed. The result output unit 13 is included in the second call terminal. The interpreter output unit 19 is included in the second call terminal.

Figure 11:
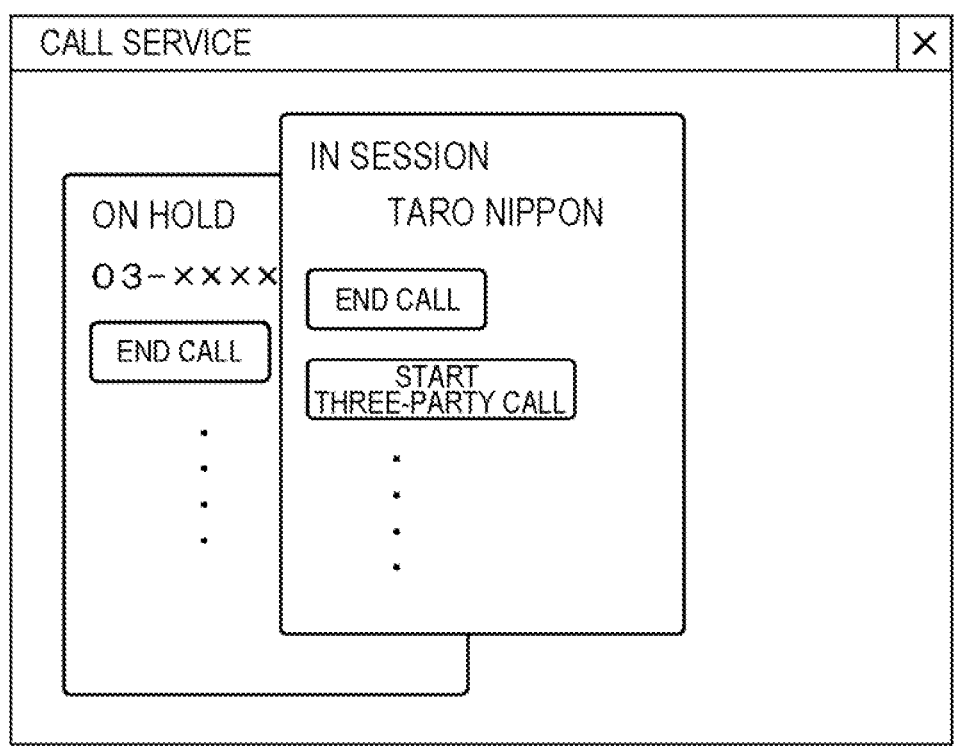
FIG. 11 is a diagram schematically illustrating one example of a screen that the processing system according to the example embodiment outputs.

For example, in the screen illustrated in FIG. 10, when the call button of one interpreter is pressed (an input specifying one interpreter (S28)), the second call terminal determines contact information of the specified interpreter, based on the interpretation staff information (see FIG. 6), and sends a call request to the third call terminal of the interpreter (S29). When a call acceptance to the call request is sent from the third call terminal to the second call terminal (S30), a state that allows a call to be performed between the second call terminal and the third call terminal is established (S31). One example of a screen displayed on the second call terminal in the state is illustrated in FIG. 11. In the drawing, a window including information indicating that a call is in session, a name of the specified interpreter, and UI buttons for performing various types of operations is illustrated. The UI buttons include a call end button for ending a call, a three-party call start button for starting a three-party call including a calling party who has been put on hold, and the like.

When, in the screen, the responding operator presses the three-party call start button (S32), a state that allows a three-party call to be performed among the first call terminal, the second call terminal, and the third call terminal is established.

Herein, a variation according to the example embodiment will be described. In the example described using the sequence diagram in FIG. 7, when a calling party is a foreigner, a three-party call including the calling party, a responding operator, and an interpretation staff member related to a language of the calling party is performed. In a variation, when a calling party is a foreigner, a responding operator may transfer a call to a responding operator for a specific language, who is related to the language of the calling party. The responding operator for a specific language is an operator who has a similar skill to that of the responding operator and is able to perform customer response in the specific language.

Figure 7:
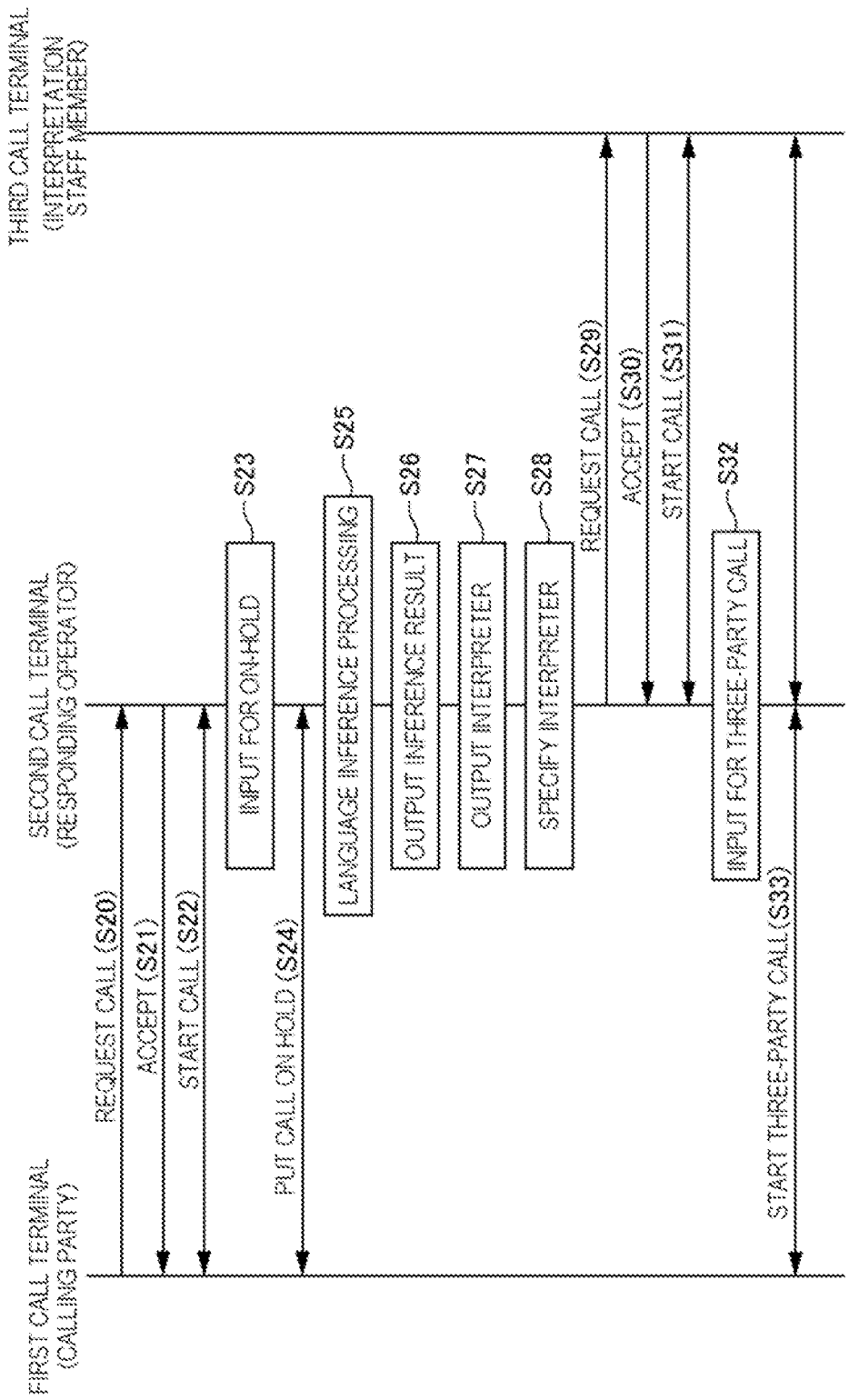
FIG. 7 is a sequence diagram illustrating one example of a flow of the processing in the processing system according to the example embodiment.

In a case of the variation, it is only required to replace "interpreter" in the description of processing that was made by use of the sequence diagram in FIG. 7 with "responding operator for a specific language". When a predetermined input is performed to the second call terminal or the third call terminal after S31, a transfer that switches a call between the first call terminal and the second call terminal to a call between the first call terminal and the third call terminal is performed.

Further, in the example described by use of the sequence diagram in FIG. 7, after a call puts into a hold state in response to an operation to the hold button, the language inference processing is started in response to an operation to the language inference button. As another variation, it may be possible to perform an operation to the language inference button while maintaining a call state, and the language inference processing may be performed while maintaining a call state. Alternatively, in response to an operation to the hold button, the language inference processing may be started at the same time as a call is put into a hold state. In other words, an operation to the hold button may serve as both an instruction to put a call into a hold state and an instruction to start the language inference processing.

In addition, a part of processing (for example: S32) to be performed in response to an operation by a user or an operator may be replaced with mechanical automatic processing. In this case, advantageous effects according to the example embodiment are also achieved.

The processing system 10 according to the example embodiment described above enables similar advantageous effects as the first example embodiment to be achieved.

The processing system 10 according to the example embodiment can be utilized in a call center or the like where customer response is performed through a call. When a phone call from a foreigner arrives at a call center and a language of the foreigner is not recognized, it takes a long time to find an appropriate interpreter related to the language and an inconvenience that a customer is made to wait may occur. The processing system 10 according to the example embodiment enables such inconvenience to be reduced. As a result, it is possible to increase a degree of customer satisfaction with a call center.

Third Example Embodiment

A processing system 10 according to a example embodiment has a similar configuration to that of the second example embodiment, and differs from the first and second example embodiments in a point that whether an inference result is correct is determined by a means different from those in the first and second example embodiments.

One example of a hardware configuration of the processing system 10 is similar to the first and second example embodiments.

One example of a functional block diagram of the processing system 10 is illustrated in FIG. 4. As illustrated, the processing system 10 includes an acquisition unit 11, an inference unit 12, a result output unit 13, a determination unit 14, a learning data output unit 15, a call unit 16, a call control unit 17, an interpreter extraction unit 18, and an interpreter output unit 19. Note that, although not illustrated, the processing system 10 may include a learning data storage unit 21 and an inference model generation unit 22.

The processing system 10 is constituted of a call terminal 1 or both the call terminal 1 and a server 2 illustrated in FIG. 5. In other words, the call terminal 1 may include all the functional units that the processing system 10 includes. Alternatively, the call terminal 1 may include some of the functional units that the processing system 10 includes and the server 2 may include the other functional units. The call terminal 1 may be an apparatus in which a predetermined functional unit is set up by installing a predetermined application into a terminal apparatus such as a personal computer, a tablet terminal, and a smartphone or may be a terminal that is dedicated to a call and in which a predetermined functional unit is set up in advance.

The configurations of the acquisition unit 11, the inference unit 12, the result output unit 13, the learning data output unit 15, the call unit 16, the call control unit 17, the interpreter extraction unit 18, and the interpreter output unit 19 are similar to those of the first or second example embodiment.

When an elapsed time since a three-party call including a calling party and an interpreter is started exceeds a predetermined time, the determination unit 14 determines that an inference result is correct. The other configuration of the determination unit 14 is similar to that of the first or second example embodiment.

Next, one example of a flow of processing in the processing system 10 will be described. A flow until a three-party call including a calling party and an interpreter is started is as described in the second example embodiment (see FIG. 7).

Figure 12:
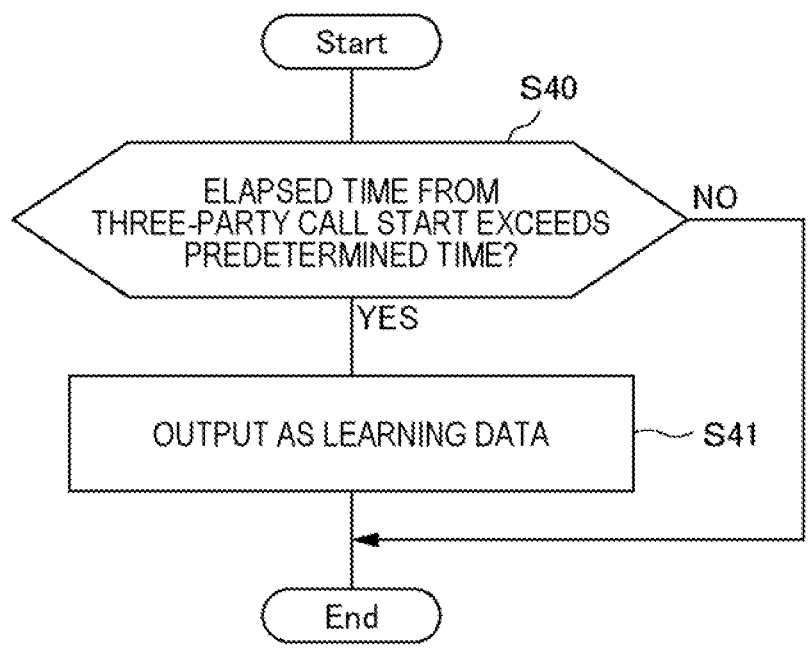
FIG. 12 is a flowchart illustrating one example of a flow of the processing in the processing system according to the example embodiment.

When a three-party call is started, the determination unit 14 monitors an elapsed time from the start of the three-party call. As illustrated in a flowchart in FIG. 12, when the three-party call is ended without the elapsed time exceeding the predetermined time (No in S40), the determination unit 14 determines that an inference result in S25 is not correct, and terminates the process.

On the other hand, when the elapsed time exceeds the predetermined time (Yes in S40), the determination unit 14 determines that the inference result in S25 is correct. The learning data output unit 15 outputs target speech data or a target feature value acquired in S25 and the inference result inferred in S25, as learning data (S41).

Note that, when a call is transferred to a responding operator for a specific language and the predetermined time has elapsed, the determination unit 14 may determine that the inference result is correct.

The processing system 10 according to the example embodiment described above enables similar advantageous effects as the first or second example embodiment to be achieved. Further, the processing system 10 according to the example embodiment enables whether an inference result is correct to be determined based on information that is acquired by a means other than a user input and indirectly indicates whether the inference result is correct. Since whether an inference result is correct can be determined without a user input, it is possible to reduce user burden.

Further, when a period during which a three-party call including a calling party and an interpreter continued or a period during which a call continued since the call was transferred to a responding operator for a specific language exceeds a predetermined time, the processing system according to the example embodiment determines that an inference result is correct. Since, when an inference result is wrong, an interpreter is switched to another interpreter or a call is re-transferred to a responding operator for another specific language, the above-described duration time becomes comparatively short. The processing system 10 according to the example embodiment that determines whether an inference result is correct, based on the above-described duration time, is able to determine whether the inference result is correct with high precision.

Fourth Example Embodiment

A processing system 10 according to the example embodiment has a similar configuration to that of the second example embodiment, and differs from the first to third example embodiments in a point that whether an inference result is correct is determined by a means different from those in the first to third example embodiments.

One example of a hardware configuration of the processing system 10 is similar to the first to third example embodiments.

One example of a functional block diagram of the processing system 10 is illustrated in FIG. 4. As illustrated, the processing system 10 includes an acquisition unit 11, an inference unit 12, a result output unit 13, a determination unit 14, a learning data output unit 15, a call unit 16, a call control unit 17, an interpreter extraction unit 18, and an interpreter output unit 19. Note that, although not illustrated, the processing system 10 may include a learning data storage unit 21 and an inference model generation unit 22.

The processing system 10 is constituted of a call terminal 1 or both the call terminal 1 and a server 2 illustrated in FIG. 5. In other words, the call terminal 1 may include all the functional units that the processing system 10 includes. Alternatively, the call terminal 1 may include some of the functional units that the processing system 10 includes and the server 2 may include the other functional units. The call terminal 1 may be an apparatus in which a predetermined functional unit is set up by installing a predetermined application into a terminal apparatus such as a personal computer, a tablet terminal, and a smartphone or may be a terminal that is dedicated to a call and in which a predetermined functional unit is set up in advance.

The configurations of the acquisition unit 11, the inference unit 12, the result output unit 13, the learning data output unit 15, the call unit 16, the interpreter extraction unit 18, and the interpreter output unit 19 are similar to those of any one of the first to third example embodiments.

The call control unit 17, after putting a call with a calling party on hold and causing a call with a specified interpreter to be started, reproduces target speech data, and sends a reproduced sound to a call terminal of the interpreter. When the call control unit 17 subsequently receives a predetermined input, the call control unit 17 causes a three-party call including the calling party and the interpreter to be started. The other configuration of the call control unit 17 is similar to that of any one of the first to third example embodiments.

When a three-party call is started, the determination unit 14 determines that an inference result is correct. The other configuration of the determination unit 14 is similar to that of any one of the first to third example embodiments.

Next, by use of a sequence diagram in FIG. 13, one example of a flow of processing in the processing system 10 will be described.

A first call terminal, a second call terminal, and a third call terminal are similar to that described in the second example embodiment. Processing in S50 to S61 is similar to processing in S20 to S31 in FIG. 7, which is described in the second example embodiment.

Figure 14:
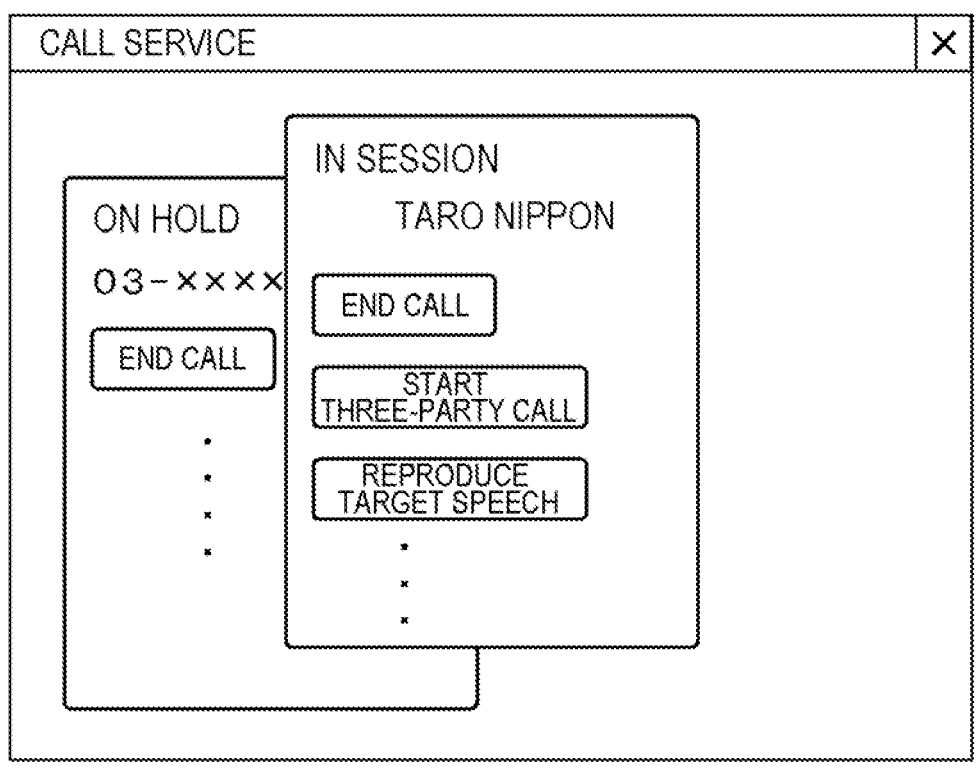
FIG. 14 is a diagram schematically illustrating one example of a screen that the processing system according to the example embodiment outputs.

One example of a screen displayed on the second call terminal when a state that allows a call to be performed between the second call terminal and the third call terminal is established as indicated in S61 is illustrated in FIG. 14. In the drawing, a window including information indicating that a call is in session, the name of a specified interpreter, and UI buttons for performing various types of operations is illustrated. The UI buttons include a call end button for ending a call, a three-party call start button for starting a three-party call including a calling party who has been put on hold, a target speech reproduction button for reproducing target speech data and making the interpreter hear the target speech, and the like.

When, in the screen, a responding operator presses the target speech reproduction button, the second call terminal reproduces the target speech data (S62). As a result, the interpreter is able to hear the target speech. The interpreter determines whether the target speech is spoken in a language of which the interpreter himself/herself is in charge, and notifies the responding operator, with whom the interpreter is having a call, of a result of the determination. The determination result may be verbally notified, or may be notified through notification utilizing a system. The notification utilizing a system may be achieved through transmission and reception of a message via, for example, an application being executed in the second call terminal and the third call terminal, and the like.

When the target speech is spoken in the language of which the interpreter is in charge, the responding operator presses the three-party call start button in, for example, the screen illustrated in FIG. 14 (S63). As a result, a state that allows a three-party call to be performed among the first call terminal, the second call terminal, and the third call terminal is established (S64). The determination unit 14 determines that an inference result inferred in S55 is correct, and the learning data output unit 15 outputs the target speech data or a target feature value acquired in S55 and the inference result inferred in S55, as learning data (S65).

Herein, a variation according to the example embodiment will be described. In the example described using the sequence diagram in FIG. 13, when a calling party is a foreigner, a three-party call including the calling party, a responding operator, and an interpretation staff member related to a language of the calling party is performed. In a variation, when a calling party is a foreigner, a responding operator may transfer a call to a responding operator for a specific language, who is related to the language of the calling party. The responding operator for a specific language is an operator who has a similar skill to that of the responding operator and is able to perform customer response in the specific language.

Figure 13:
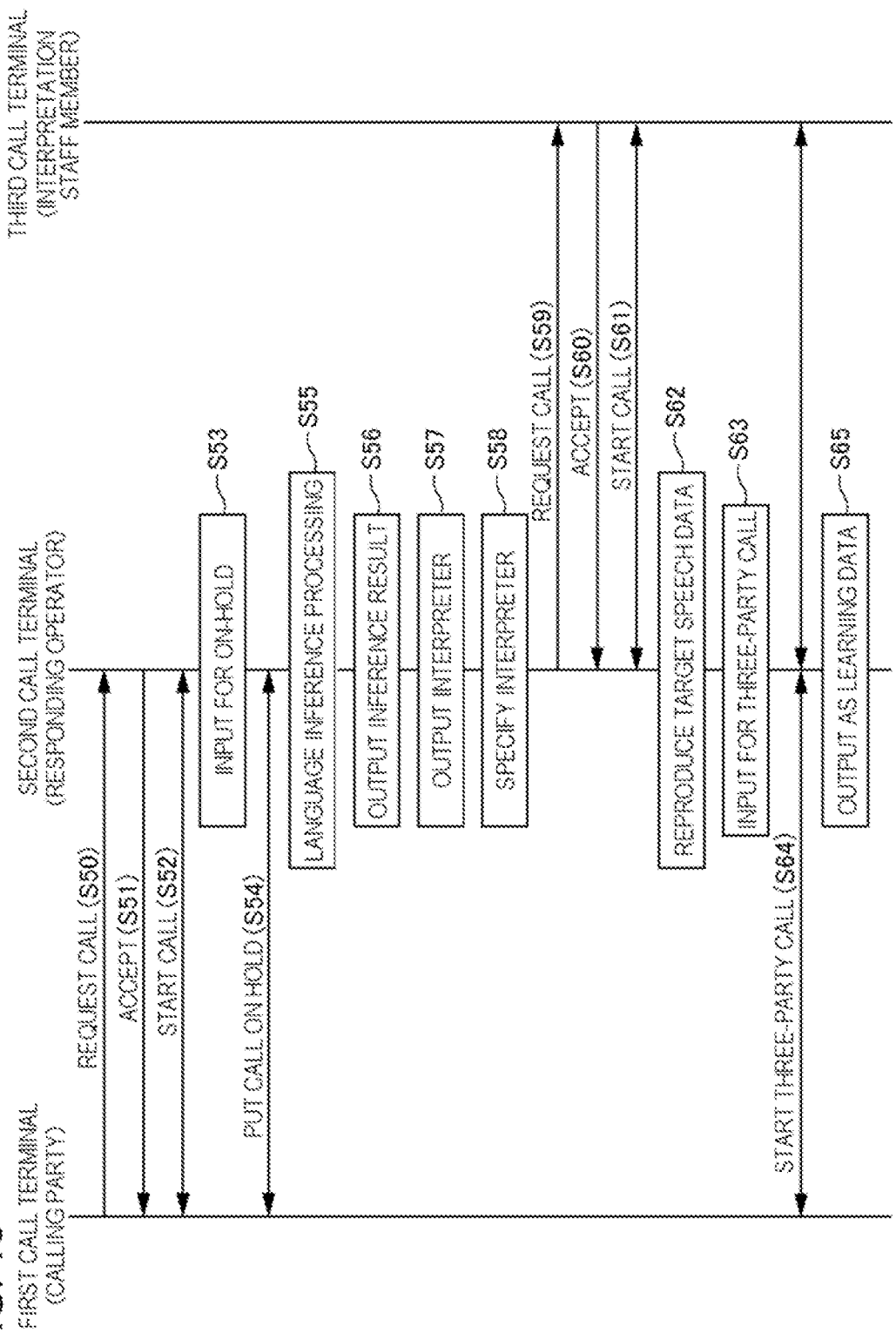
FIG. 13 is a sequence diagram illustrating one example of a flow of the processing in the processing system according to the example embodiment.

In a case of the variation, it is only required to replace "interpreter" in the description of processing that was made by use of the sequence diagram in FIG. 13 with "responding operator for a specific language". When a predetermined input is performed to the second call terminal or the third call terminal after S62, a transfer that switches a call between the first call terminal and the second call terminal to a call between the first call terminal and the third call terminal is performed.

When the transfer that switches a call between the first call terminal and the second call terminal to a call between the first call terminal and the third call terminal is performed, the determination unit 14 determines that an inference result inferred in S55 is correct. The learning data output unit 15 outputs the target speech data or the target feature value acquired in S55 and the inference result inferred in S55, as learning data.

In addition, a part of processing (for example: S62, S63, and the like) to be performed in response to an operation by a user or an operator may be replaced with mechanical automatic processing. In this case, advantageous effects according to the example embodiment are also achieved.

The processing system 10 according to the example embodiment described above enables similar advantageous effects as any one of the first to third example embodiments to be achieved. Further, the processing system 10 according to the example embodiment enables whether an inference result is correct to be determined based on information that is acquired by a means other than a user input and indirectly indicates whether the inference result is correct. Since whether an inference result is correct can be determined without a user input, it is possible to reduce user burden.

Further, the processing system 10 according to the example embodiment is able to, before performing a three-party call or a transfer of a call, reproduce target speech data and make an interpreter or a responding operator for a specific language hear the target speech. The processing system 10 according to the example embodiment is also able to, based on a determination result by the interpreter or the responding operator for a specific language who has heard the target speech (a result of determination of whether the language of the target speech is a language of which the interpreter or the responding operator for a specific language himself/herself is in charge), determine whether a three-party call or a transfer of a call is to be performed. When an inference result by the inference unit 12 is wrong, a three-party call or a transfer of a call is not performed. In other words, when a three-party call or a transfer of a call is performed, it can be said that the inference result by the inference unit 12 is correct.

The processing system 10 according to the example embodiment that determines whether an inference result is correct, based on whether a three-party call or a transfer of a call is performed after target speech data is reproduced is able to determine whether an inference result is correct with high precision.

Fifth Example Embodiment

A processing system 10 according to a example embodiment has a similar configuration to that of the second example embodiment, and differs from the first to fourth example embodiments in a point that whether an inference result is correct is determined by a means different from those in the first to fourth example embodiments.

One example of a hardware configuration of the processing system 10 is similar to the first to fourth example embodiments.

One example of a functional block diagram of the processing system 10 is illustrated in FIG. 4. As illustrated, the processing system 10 includes an acquisition unit 11, an inference unit 12, a result output unit 13, a determination unit 14, a learning data output unit 15, a call unit 16, a call control unit 17, an interpreter extraction unit 18, and an interpreter output unit 19. Note that, although not illustrated, the processing system 10 may include a learning data storage unit 21 and an inference model generation unit 22.

The processing system 10 is constituted of a call terminal 1 or both the call terminal 1 and a server 2 illustrated in FIG. 5. In other words, the call terminal 1 may include all the functional units that the processing system 10 includes. Alternatively, the call terminal 1 may include some of the functional units that the processing system 10 includes and the server 2 may include the other functional units. The call terminal 1 may be an apparatus in which a predetermined functional unit is set up by installing a predetermined application into a terminal apparatus such as a personal computer, a tablet terminal, and a smartphone or may be a terminal that is dedicated to a call and in which a predetermined functional unit is set up in advance.

The configurations of the acquisition unit 11, the inference unit 12, the result output unit 13, the learning data output unit 15, the call unit 16, the interpreter extraction unit 18, and the interpreter output unit 19 are similar to those of any one of the first to fourth example embodiments.

The call control unit 17, while keeping a call with a calling party on hold, reproduces a holding sound that outputs a predetermined message in a language indicated by an inference result, and sends a reproduced sound to a call terminal of the calling party. For example, the message may be "Do you want to talk in the language in which this message is now announced? If you want, press 1, or if you want to talk in another language, press 2." or the like.

The determination unit 14 accepts a predetermined input from the calling party during the reproduction of the holding sound. The determination unit 14 determines that an inference result by the inference unit 12 is correct when the input from the calling party is a first input, and determines that the inference result by the inference unit 12 is not correct when the input from the calling party is a second input. The determination unit 14 can also determine that the inference result is not correct when no input is received from the calling party within a predetermined time limit. The predetermined time limit is defined by, for example, an elapsed time from a timing at which the above-described message is output up to the end of the message.

The predetermined input from the calling party is performed with respect to the above-described message. For example, when the message is "Do you want to talk in the language in which this message is now announced? If you want, press 1, or if you want to talk in another language, press 2.", the predetermined input is an input performed by pressing a button 1 or an input performed by pressing a button 2. In a case of this example, the input performed by pressing the button 1 serves as the first input, and the input performed by pressing the button 2 serves as the second input.

Note that, when an inference result includes a plurality of languages, the call control unit 17 may first reproduce a message spoken in a language that has the highest reliability, and, when the input from the calling party is the second input or no input is received from the calling party within the predetermined time limit, the call control unit 17 may reproduce a message spoken in another language that has the second highest reliability.

Figure 15:
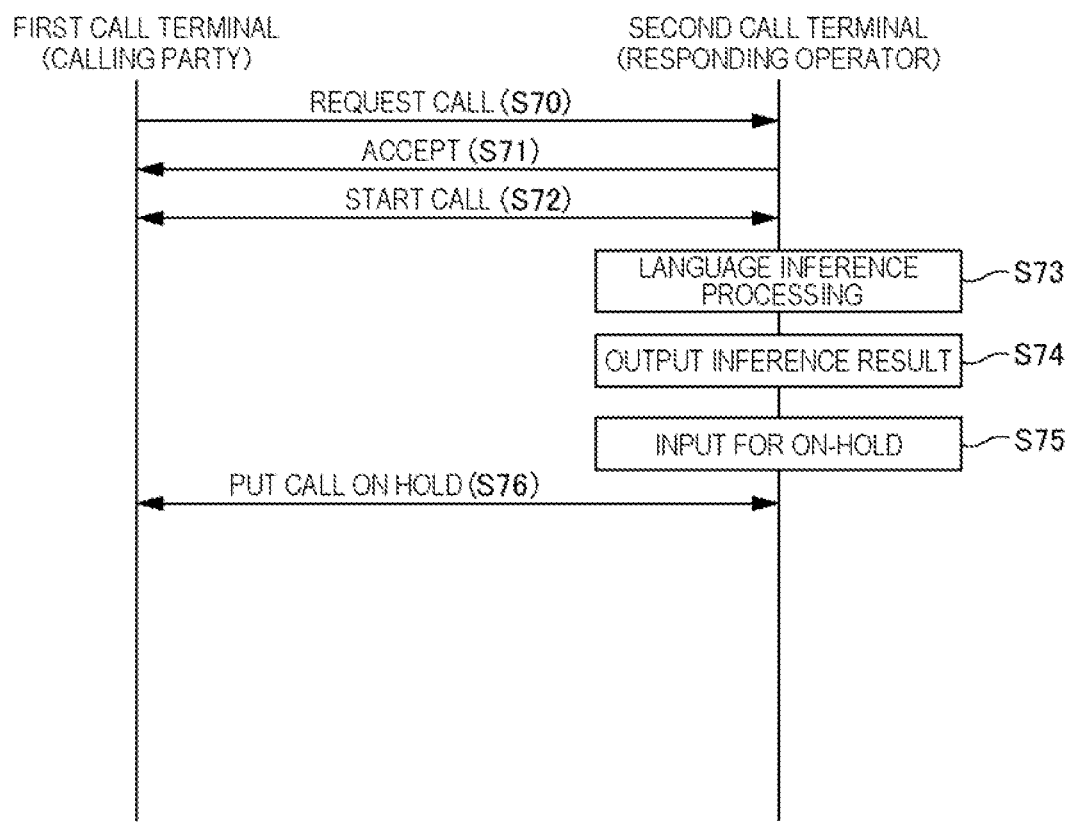
FIG. 15 is a sequence diagram illustrating one example of a flow of the processing in the processing system according to the example embodiment.

Next, by use of a sequence diagram in FIG. 15, one example of a flow of processing in the processing system 10 will be described.

A first call terminal, a second call terminal, and a third call terminal are similar to that described in the second example embodiment.

First, when a call request is sent from the first call terminal to the second call terminal (S70) and a call acceptance to the call request is sent from the second call terminal to the first call terminal (S71), a call is started between the first call terminal and the second call terminal (S72) and a state that allows a call to be performed (call state) is established. One example of a screen displayed on the second call terminal in the call state is illustrated in FIG. 8. Since description of the screen in FIG. 8 is made in the second example embodiment, the description thereof is not repeated in the example embodiment.

When a responding operator, although recognizing that the calling party is a foreigner, cannot recognize a language of the calling party during a call, the responding operator causes language inference processing to be performed by pressing a language inference button. In response to the input, the language inference processing is performed (S73).

In S73, the acquisition unit 11 acquires target speech data in which a speech of the calling party is recorded or a target feature value that indicates a feature of the speech of the calling party. For example, the second call terminal may be configured in such a way that all calls are recorded regardless of a calling party. The acquisition unit 11 may acquire a portion or all of speech data being recorded as described above, as target speech data. The acquisition unit 11 may also extract a target feature value from the target speech data acquired in this manner.

Succeedingly, the inference unit 12 infers a language of the target speech, based on an inference model generated by the inference model generation unit 22 and the target speech data or the target feature value acquired by the acquisition unit 11.

Figure 16:
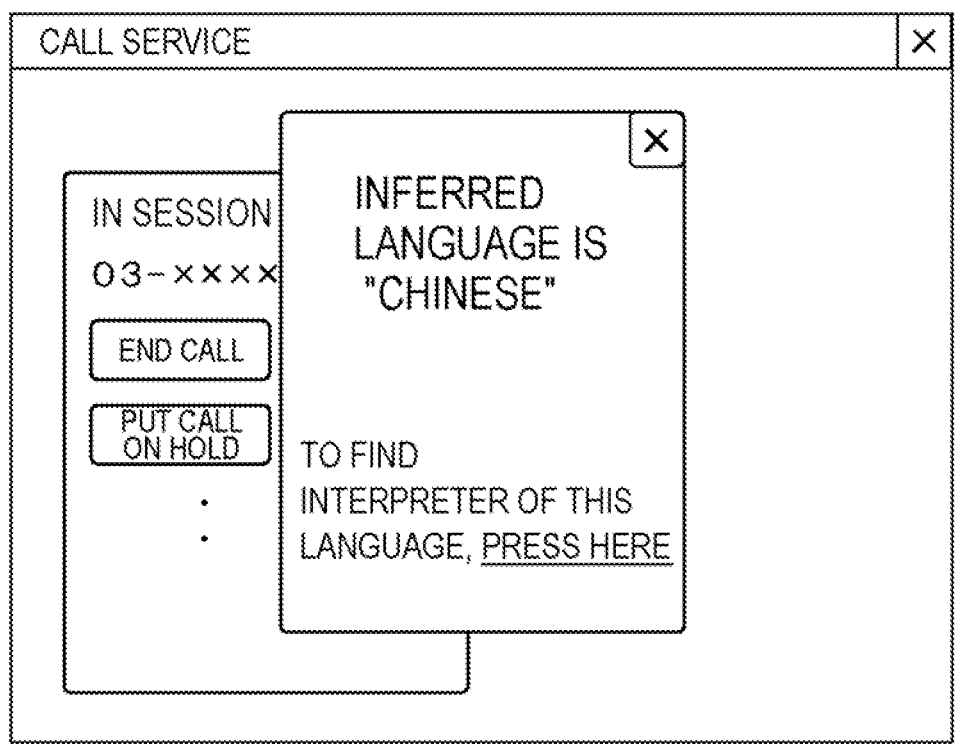
FIG. 16 is a diagram schematically illustrating one example of a screen that the processing system according to the example embodiment outputs.

The result output unit 13 outputs an inferred inference result (S74). In FIG. 16, one example of a screen being displayed on the second call terminal when the result output unit 13 outputs an inference result is illustrated. In the drawing, a window indicating an inference result is displayed. In the window, a link to information indicating an interpreter of a language indicated by the inference result is set.

Figure 17:
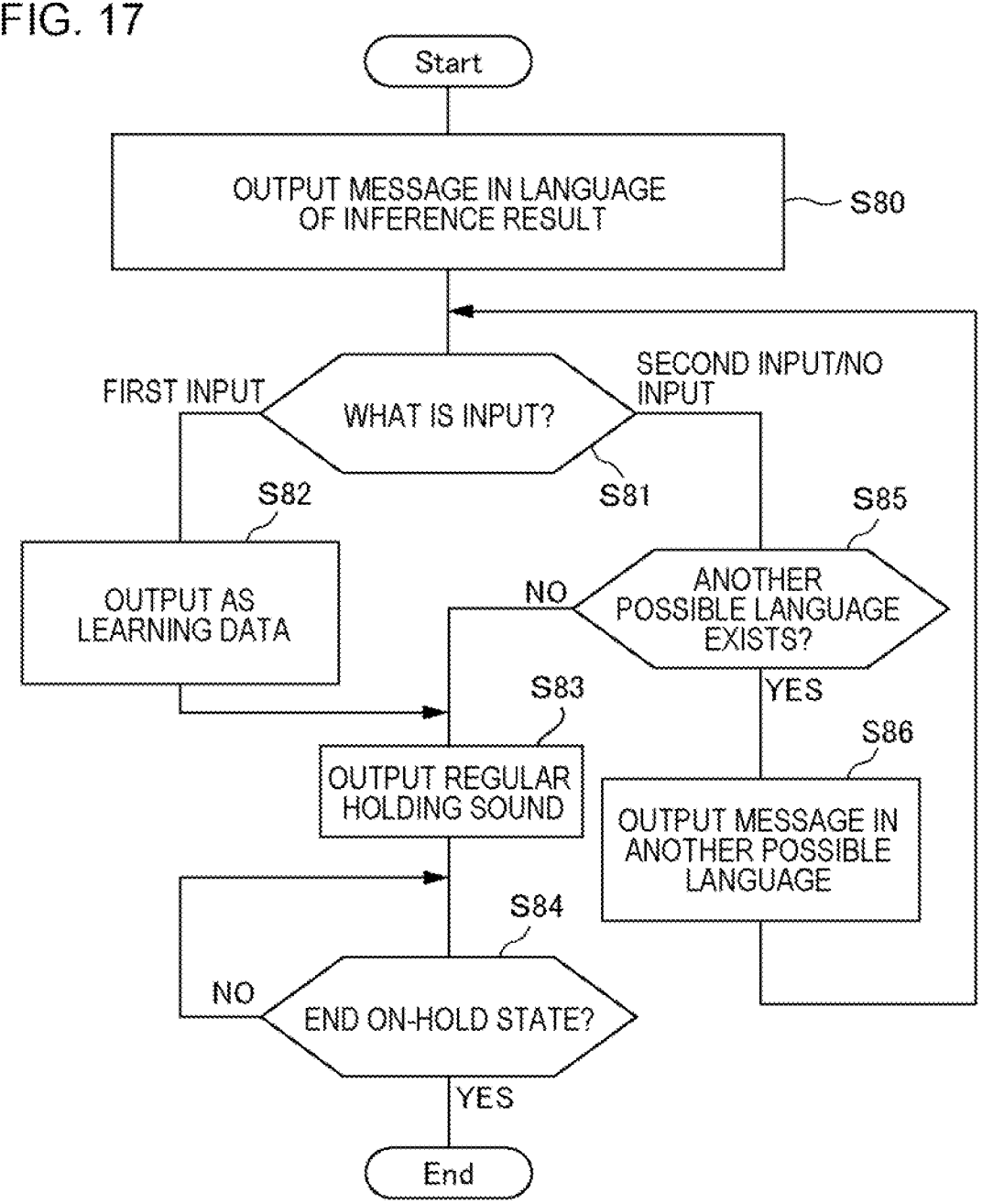
FIG. 17 is a flowchart illustrating one example of a flow of the processing in the processing system according to the example embodiment.

For example, in the screen illustrated in FIG. 16, when a hold button for putting a call with the calling party on hold is pressed (S75), a call between the first call terminal and the second call terminal is put into a hold state (S76). During the hold state, the second call terminal performs processing illustrated in FIG. 17.

First, the call control unit 17 reproduces a holding sound that outputs a predetermined message in the language indicated by the inference result inferred in S73, and sends a reproduced sound to the first call terminal (S80). When there are a plurality of languages indicated by the inference result, the call control unit 17 reproduces a holding sound that outputs the predetermined message in a language that has the highest reliability, and sends a reproduced sound to the first call terminal.

Subsequently, the second call terminal waits for a user input being performed via the first call terminal. When a first input is performed (the first input in S81), the determination unit 14 determines that the inference result is correct. The learning data output unit 15 outputs the language of the output message and the target speech data or the target feature value acquired in S73, as learning data (S82). Thereafter, the call control unit 17 reproduces a regular holding sound (for example: music, or the like), and sends a reproduced sound to the first call terminal until receiving an input for terminating the hold state (S83).

On the other hand, when a second input is performed or no input is received within a predetermined time limit (the second input/no input in S81), the call control unit 17 determines whether another possible language exists (S85). For example, in a case where another language exists in the inference result, in a case where another language that has reliability equal to or higher than a predetermined level exists in the inference result, in a case where another language that is registered in advance as a possible language exists regardless of the inference result, or the like, the call control unit 17 can determine that there exists another possible language.

When there exists no other possible language (No in S85), the call control unit 17 reproduces the regular holding sound (for example: music, or the like), and sends a reproduced sound to the first call terminal until receiving an input for terminating the hold state (S83).

When there exists another possible language (Yes in S85), the call control unit 17 reproduces a holding sound that outputs a predetermined message in the another possible language, and sends a reproduced sound to the first call terminal (S86). The process returns to S81 and repeats similar processing.

Note that, during the hold state in S76, the processing in S26 to S32 described by use of FIG. 7 and the processing in S56 to S63 described by use of FIG. 13 may be performed.

In addition, a part of processing (for example: S75, S76, and the like) to be performed in response to an operation by a user or an operator may be replaced with mechanical automatic processing. In this case, advantageous effects according to the example embodiment are also achieved.

The processing system 10 according to the example embodiment described above enables similar advantageous effects as any one of the first to fourth example embodiments to be achieved. Further, the processing system 10 according to the example embodiment is able to, during the hold state, reproduce a message in a language of an inference result and make a calling party hear the message. The processing system 10 according to the example embodiment is able to determine whether an inference result is correct, based on an input from the calling party with respect to the message. The processing system 10 according to the example embodiment as described above enables whether an inference result is correct to be determined with high precision.

Hereinafter, examples of reference aspects will be appended.

1. A processing system including:
    an acquisition unit that acquires target speech data in which a target speech being a speech subject to language inference is recorded or a target feature value that indicates a feature of the target speech;
    an inference unit that infers a language of the target speech, based on an inference model for inferring a language of a speech from speech data in which the speech is recorded or a speech feature value that indicates a feature of the speech and the target speech data or the target feature value;
    a result output unit that outputs an inference result by the inference unit;
    a determination unit that determines whether the inference result is correct; and
    a learning data output unit that outputs the inference result being determined to be correct by the determination unit and the target speech data or the target feature value, as learning data for generating the inference model.

2. The processing system according to supplementary note 1, further including:
    a call unit, in which
    the acquisition unit that acquires the target speech data in which a speech of a calling party is recorded or the target feature value that indicates a feature of a speech of the calling party, the system further including:
    an interpreter extraction unit that refers to interpretation staff information in which an interpreter for each of a plurality of languages and contact information are registered and extracts the interpreter for a language indicated by the inference result;
    an interpreter output unit that outputs information indicating the extracted interpreter; and
    a call control unit that puts a call with a calling party on hold and causes a call with the interpreter who is specified from among the extracted interpreters to be started.

3. The processing system according to supplementary note 2, in which,
    when the call control unit, after putting a call with the calling party on hold and causing a call with the specified interpreter to be started, receives a predetermined input, the call control unit starts a three-party call including the calling party and the interpreter, and,
    when an elapsed time since the three-party call is started exceeds a predetermined time, the determination unit determines that the inference result is correct.

4. The processing system according to supplementary note 2, in which,
    when the call control unit, after putting a call with the calling party on hold and causing a call with the specified interpreter to be started, reproduces the target speech data, sends a reproduced sound to a call terminal of the interpreter, and subsequently receives a predetermined input, the call control unit causes a three-party call including the calling party and the interpreter to be started, and,
    when the three-party call is started, the determination unit determines that the inference result is correct.

5. The processing system according to any one of supplementary notes 2 to 4, wherein
    the call control unit, while keeping a call with the calling party on hold, reproduces a holding sound that outputs a predetermined message in a language indicated by the inference result, and sends a reproduced sound to a call terminal of the calling party, and
    the determination unit accepts a predetermined input from the calling party during reproduction of the holding sound, determines that the inference result is correct when an input from the calling party is a first input, and determines that the inference result is not correct when an input from the calling party is a second input.

6. The processing system according to supplementary note 5, in which
    the determination unit determines that the inference result is not correct when no input is received from the calling party within a predetermined time limit.

7. The processing system according to supplementary note 5 or 6, in which,
    when the inference result includes a plurality of languages, the call control unit reproduces the message spoken in a language that has highest reliability, and, when an input from the calling party is a second input or there is no input from the calling party within a predetermined time limit, the call control unit reproduces the message spoken in a language that has second highest reliability.

8. A processing method executed by a computer, the method comprising:
    an acquisition step of acquiring target speech data in which a target speech being a speech subject to language inference is recorded or a target feature value that indicates a feature of the target speech;
    an inference step of inferring a language of the target speech, based on an inference model for inferring a language of a speech from speech data in which the speech is recorded or a speech feature value that indicates a feature of the speech and the target speech data or the target feature value;
    a result output step of outputting an inference result in the inference step;
    a determination step of determining whether the inference result is correct; and
    a learning data output step of outputting the inference result being determined to be correct in the determination step and the target speech data or the target feature value, as learning data for generating the inference model.

9. A program causing a computer to function as:
an acquisition unit that acquires target speech data in which a target speech being a speech subject to language inference is recorded or a target feature value that indicates a feature of the target speech;
an inference unit that infers a language of the target speech, based on an inference model for inferring a language of a speech from speech data in which the speech is recorded or a speech feature value that indicates a feature of the speech and the target speech data or the target feature value;
a result output unit that outputs an inference result by the inference unit;
a determination unit that determines whether the inference result is correct; and
a learning data output unit that outputs the inference result being determined to be correct by the determination unit and the target speech data or the target feature value, as learning data for generating the inference model.

This application claims priority based on Japanese Patent Application No. 2018-231461, filed on Dec. 11, 2018, the entire disclosure of which is incorporated herein by reference.

The invention claimed is:

1. A processing system comprising:
at least one memory configured to store one or more instructions; and
at least one processor configured to execute the one or more instructions to:
make a call between a calling party and an operator;
acquire target speech data in which target speech of the calling party is recorded or a target feature value that indicates a feature of the target speech is included;
infer a language of the target speech, based on an inference model that provides an output language of speech from input speech data in which the speech is recorded or a speech feature value that indicates a feature of the speech, and the target speech data or the target feature value;
output an inference result indicating the language of the target speech;
refer to interpretation staff information in which an interpreter for each of a plurality of languages and contact information are registered and extract the interpreter for the language indicated by the inference result;
output information indicating the extracted interpreter;
place the call between the calling party and the operator on hold, start a call between the operator and the extracted interpreter, and reproduce the target speech data in the call between the operator and the extracted interpreter; and
start a three-party call including the calling party, the operator, and the extracted interpreter when receiving a predetermined input after reproducing the target speech data in the call between the operator and the extracted interpreter.

2. The processing system according to claim 1, wherein the processor is further configured to execute the one or more instructions to:
while keeping the call between the calling party and the operator on hold, reproduce a holding sound that outputs a predetermined message in the language indicated by the inference result, and send a reproduced sound to a call terminal of the calling party, and
accept the predetermined input from the calling party during reproduction of the holding sound, determine that the inference result is correct when predetermined input from the calling party is a first input, and determine that the inference result is not correct when the predetermined input from the calling party is a second input.

3. The processing system according to claim 2, wherein the processor is further configured to execute the one or more instructions to:
determine that the inference result is not correct when no input is received from the calling party within a predetermined time limit.

4. The processing system according to claim 2, wherein the processor is further configured to execute the one or more instructions to:
when the inference result includes a plurality of languages, reproduce the message spoken in the language of the plurality of languages that has highest reliability, and, when the input from the calling party is the second input or there is no input from the calling party within a predetermined time limit, reproduce the message spoken in the language of the plurality of languages that has second highest reliability.

5. The processing system according to claim 1, wherein the processor is further configured to execute the one or more instructions to determine that the inference result is correct when the three-party call has been started in response to the predetermined input.

6. A processing method executed by a computer, the method comprising:
making a call between a calling party and an operator;
acquiring target speech data in which target speech of the calling party is recorded or a target feature value that indicates a feature of the target speech is included;
inferring a language of the target speech, based on an inference model that provides an output language of speech from input speech data in which the speech is recorded or a speech feature value that indicates a feature of the speech, and the target speech data or the target feature value;
outputting an inference result indicating the language of the target speech;
referring to interpretation staff information in which an interpreter for each of a plurality of languages and contact information are registered and extract the interpreter for the language indicated by the inference result;
outputting information indicating the extracted interpreter;
placing the call between the calling party and the operator on hold, start a call between the operator and the extracted interpreter, and reproducing the target speech data in the call between the operator and the extracted interpreter; and
starting a three-party call including the calling party, the operator, and the extracted interpreter when receiving a predetermined input after reproducing the target speech data in the call between the operator and the extracted interpreter.

7. A non-transitory storage medium storing a program that when executable by a computer causes the computer to:
make a call between a calling party and an operator;

acquire target speech data in which target speech of the calling party is recorded or a target feature value that indicates a feature of the target speech is included;

infer a language of the target speech, based on an inference model that provides an output language of speech from input speech data in which the speech is recorded or a speech feature value that indicates a feature of the speech, and the target speech data or the target feature value;

output an inference result indicating the language of the target speech;

refer to interpretation staff information in which an interpreter for each of a plurality of languages and contact information are registered and extract the interpreter for the language indicated by the inference result;

output information indicating the extracted interpreter;

place the call between the calling party and the operator on hold, start a call between the operator and the extracted interpreter, and reproduce the target speech data in the call between the operator and the extracted interpreter; and start a three-party call including the calling party, the operator, and the extracted interpreter when receiving a predetermined input after reproducing the target speech data in the call between the operator and the extracted interpreter.

* * * * *